United States Patent
Pryor

[15] 3,654,972
[45] Apr. 11, 1972

[54] SAWMILL

[72] Inventor: Frank H. Pryor, Angle Street, Fredericksburg, Ohio 44627

[22] Filed: Mar. 21, 1969

[21] Appl. No.: 809,169

[52] U.S. Cl. ............................143/52, 143/118, 143/108 R
[51] Int. Cl. ...................................B27b 7/00, B27b 29/10
[58] Field of Search ..................................143/43–105, 118, 143/108, 40, 157, 52

[56] References Cited

UNITED STATES PATENTS

| | | | |
|---|---|---|---|
| 25,972 | 11/1859 | Littlefield | 143/140 |
| 468,733 | 2/1892 | Stinebring | 143/43–105 |
| 2,569,842 | 10/1951 | Zweifel | 143/108 |
| 2,574,974 | 11/1951 | Johnson | 143/43–105 |
| 3,068,914 | 12/1962 | Sanborn | 143/118 |
| 3,086,568 | 4/1963 | Hartzell | 143/118 X |
| 3,133,724 | 5/1964 | Shashaty | 143/118 X |

*Primary Examiner*—Donald R. Schran
*Attorney*—Schmieding and Fultz

[57] ABSTRACT

A sawmill of the type which can be controlled by a single operator from a central control station which is characterized by a plurality of timber handling devices including a timber supporting carriage mounted on a track means for delivering timbers to a cutting station, as well as apparatus for conveying sawn boards, all of which are hydraulically operated and controlled from said station. Said apparatus is further characterized by a conveyor means including an axis of delivery substantially co-extensive with the path of movement of said log supporting carriage along said track means.

1 Claim, 4 Drawing Figures

INVENTOR.
F. H. PRYOR
BY Schmieding & Sultz
ATTORNEYS

INVENTOR.
F. H. PRYOR
BY
Schmieding & Sultz
ATTORNEYS

SAWMILL

This invention relates generally to sawmills and more particularly to a mill that is adapted for one man operation from a single control station.

In general, the sawmill of the present invention comprises a main frame means for supporting associated components and a control station from which a single operator can control all of the recessory timber handling and sawing functions, including the delivery of sawn board from the sawing station.

More specifically the new sawmill apparatus is uniquely adapted for central control station operation including individual control means for each of the following apparatus that perform respective individual functions as follows: (1) a timber supporting carriage that is movable along a track means to and through the sawing station; (2) a live deck apparatus for delivery timbers to the carriage; (3) a log turning apparatus for rotatably positioning timbers on the carriage; (4) a log engaging dog mechanism for clamping the timbers on the carriage; (5) a set mechanism on the carriage for laterally moving and precisely positioning a timber with respect to the cutting path; (6) a receder mechanism on the carriage for laterally moving a timber away from the cutting path; (7) a conveyor beyond the track means for receiving and delivering boards from the cutting path; (8) a log cleaner mechanism for pre-cleaning a longitudinal path along the outer surface of a timber at the location to be engaged by the saw blade.

As another aspect of the present invention the central control station of the mill can further be provided with an individual control for a novel three-way delivery conveyor mechanism adapted to selectively discharge sawn boards from either side, or straight off the end of said conveyor.

As still another aspect of the present invention the central control station of the mill can further be provided with an additional individual control for a novel square set gauge that permits the operator to rapidly and accurately position a side of a timber with respect to the cutting path.

It is therefore a primary object of the present invention to provide a novel sawmill apparatus uniquely adapted for single operator control of a plurality of functions from a central control station thereby greatly reducing the labor requirement as compared to prior devices.

Further objects and advantages of the present invention will be apparent from the following description, reference being had to the accompanying drawings wherein a preferred form of embodiment of the invention is clearly shown.

IN THE DRAWINGS

Figure 1:
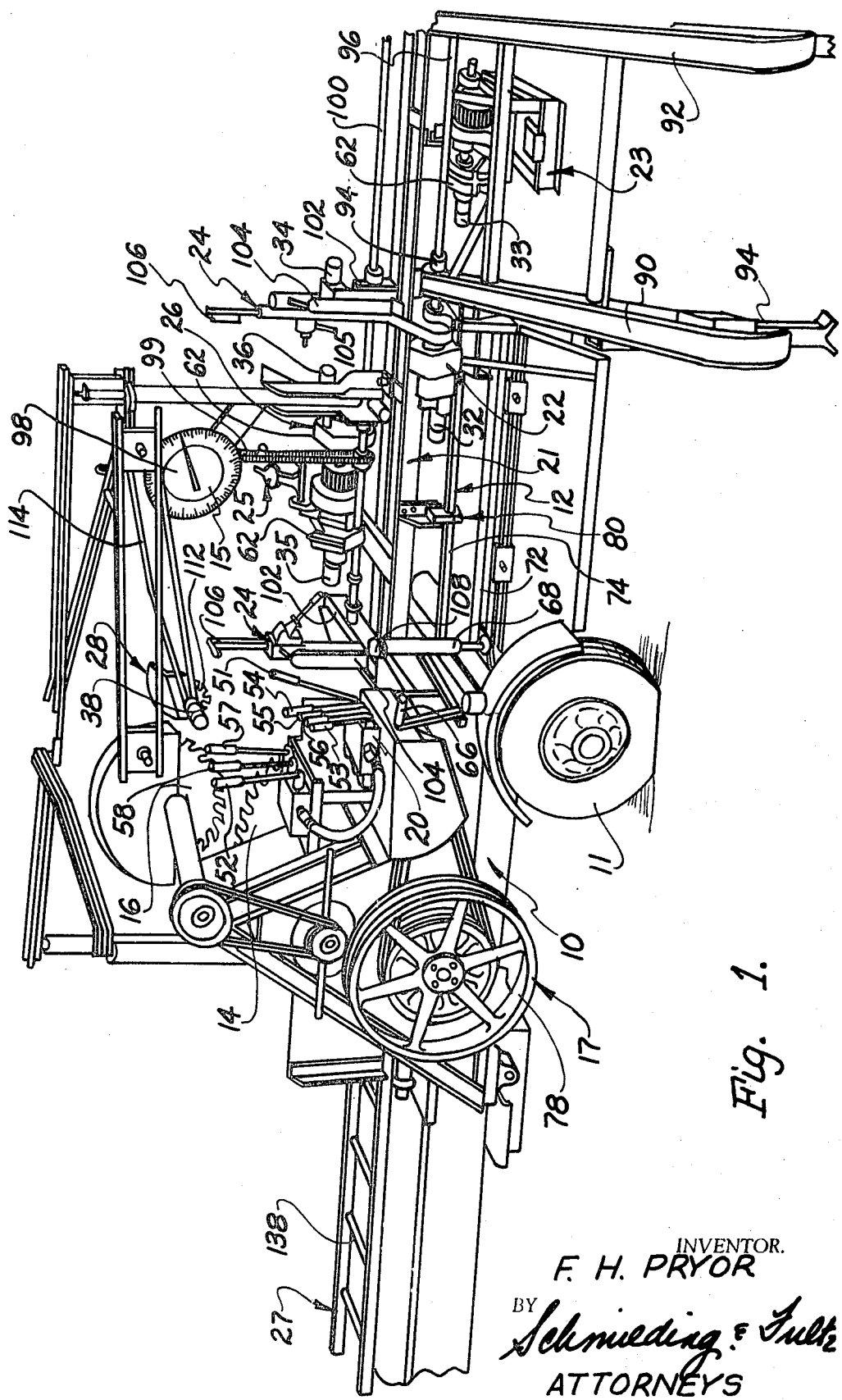
FIG. 1 is a perspective view of a sawmill constructed in accordance with the present invention.

Referring in detail to the drawings, a sawmill constructed in accordance with the present invention is illustrated in FIG. 1 and includes a frame means indicated generally at 10. The apparatus further includes a central control station 20 that is located adjacent a track means indicated generally at 12 which includes spaced tracks 72 and 74 that extend longitudinally along a cutting path, the latter being defined by the position of a main saw blade 14 rotatably mounted on frame means 10 and driven by a drive mechanism indicated generally at 17. A top saw blade 16 may also be utilized for increasing the depth of cut for relatively thick timbers. An engine, not illustrated provides power for driven pulley 78, the latter comprising a portion of drive mechanism 17.

As seen in FIG. 1, a carriage hold-down assembly indicated generally at 80 functions to assure that carriage 12 is retained on the track and serves the additional function of a track cleaning apparatus. Such hold-down assembly 80 is described in detail in my co-pending application Serial No. 809,105 filed Mar. 21, 1969 and now abandoned.

Figure 3:
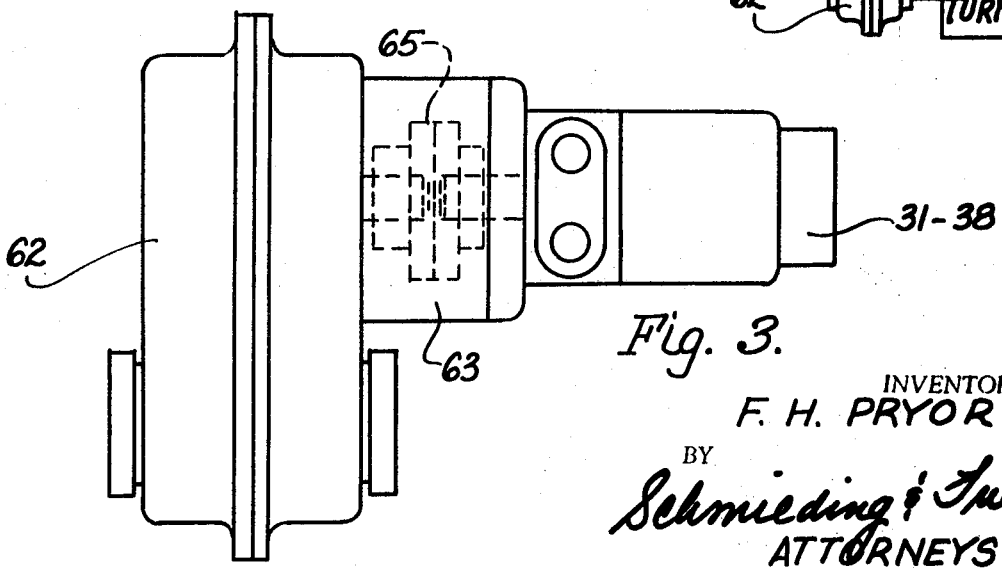
FIG. 3 is a side elevational view of a typical gear box and fluid motor used in the control system of FIG. 2.
Figure 4:
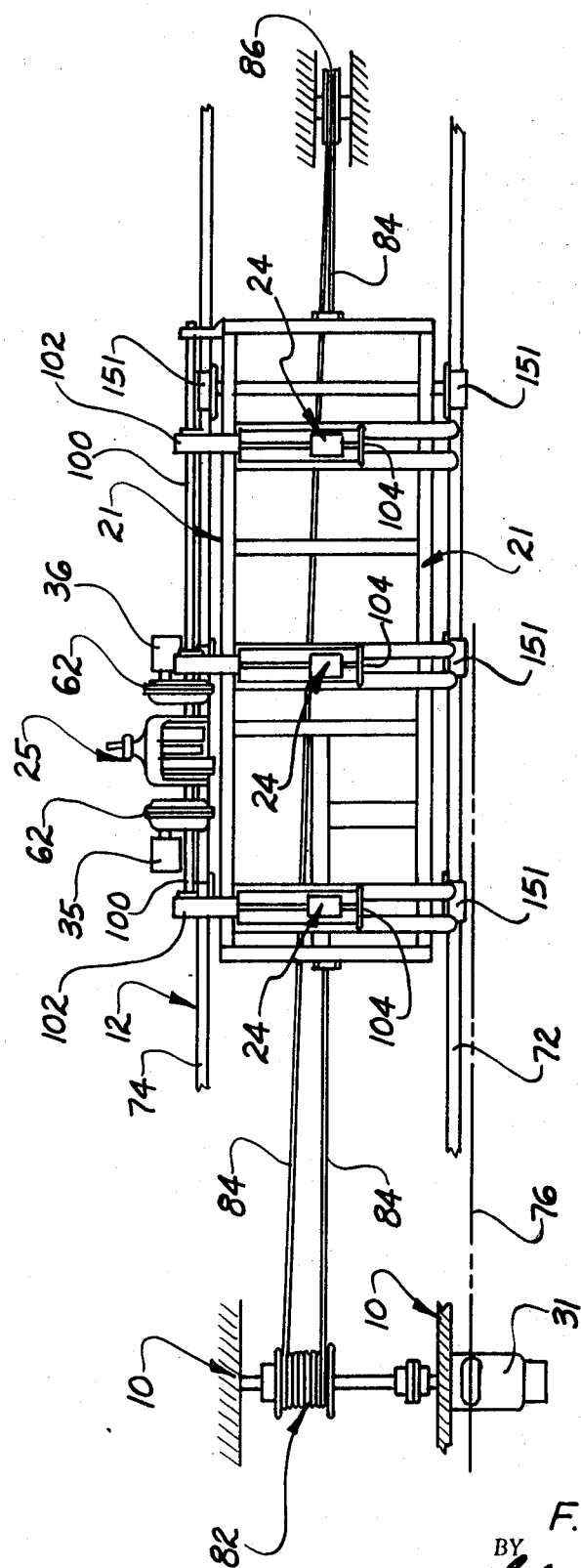
FIG. 4 is a sectional view showing a carriage and carriage drive mechanism comprising a portion of the sawmill of the preceeding figures.

With reference to FIG. 3 the timber supporting carriage 21, including timber engaging surfaces 104 and 105, is extended and retracted along the track means 12 by means of a winch mechanism indicated generally at 82, FIG. 3, that functions to extend and retract a cable 84 attached to the carriage, said cable being extended around pulleys 86. It should be mentioned that winch 82 is driven by a carriage fluid motor 31.

With continued reference to FIG. 1, the sawmill further includes a live deck apparatus, indicated generally at 22 that functions to deliver timbers to the previously mentioned carriage 21. Such apparatus comprises spaced endless belt means 90 and 92 which are mounted on and driven by pulleys 94 mounted on a shaft 96, the latter being driven by a gear box 62 and a live deck fluid motor 32.

Reference is next made to a log turner apparatus indicated generally at 23 which functions to automatically rotate the timbers about their longitudinal axes, thereby permitting the operator to properly position them on the carriage. Log turner apparatus 23 is driven by a gear box 62 and fluid motor 33.

The sawmill is further provided with timber clamping means in the form of a dog mechanism indicated generally at 24. Such mechanism is mounted on upper carriage portion 102 and includes hooks or projections 106 which serve to engage the top surface of the timber and retain it rigidly in position. It should be pointed out that dog hooks 106 are driven vertically by a fluid motor 34.

With continued reference to FIG. 1 a set mechanism indicated generally at 25 is mounted on carriage 21 and provides means whereby the operator can laterally move and precisely position a timber with respect to the cutting path established by saw blades 14 and 16. The set mechanism 25 further includes a setting gauge 98 driven by a chain 99 provided with indicia in fractions of an inch whereby the operator can precisely position a timber to establish the width of board to be cut. Set apparatus 25 drives a set shaft 100 which is in turn driven by the gear box 62 and fluid motor 35 of the set apparatus.

When set mechanism 25 rotates set shaft 100 in one direction, then a laterally movable upper carriage portion 102, provided with log positioning surfaces 104 and 105, is driven laterally towards the cutting path in the direction of control station 20.

Carriage 21 is further provided with a receder mechanism indicated generally at 26 which is driven by a gear box 62 and fluid motor 36. Such receder mechanism is adapted to rotate set shaft 100 in a direction opposite to the direction of rotation of set mechanism 25 and thereby laterally move the upper portion 102 of the carriage, together with a timber mounted thereon, away from the cutting path in a direction laterally outwardly from control station 20.

Reference is next made to a conveyor mechanism indicated generally at 27 which is located beyond the cutting path and serves to receive sawn boards and deliver same to a location beyond the cutting station. Such conveyor mechanism is preferably of a novel three-way delivery type which is described in detail in my co-pending application Ser. No. 809,246 filed Mar. 21, 1969.

It should further be mentioned that conveyor 27 can be manipulated to discharge boards either to the right, to the left, or straight off the end of the conveyor by means of a lever 66 located in control station 20.

The sawmill is further preferably provided with a square set gauge mechanism, indicated generally at 68 in FIG. 1, which mechanism comprises a gauge wheel including a peripheral edge precisely aligned with the cutting path established by saw blade 14. In operation, the operator can raise wheel 108 upwardly, by means of a pedal actuator, and then move the inner side of a timber inwardly by means of set mechanism 25 and into engagement with the periphery of gauge wheel 108 and thereby establish a zero reference on the side of the timber with respect to the saw blade. Such square set gauge mechanism is described in detail in my co-pending application Ser. No. 809,247 filed Mar. 21, 1969.

If desired, the sawmill can be provided with a log cleaner mechanism indicated generally at 28 which includes a small relatively wide rotary blade 112 driven by a log cleaner fluid motor 38, said log cleaner mechanism being mounted on a pivoted arm 114. It will be understood that the log cleaner mechanism is used to engage the top of the timber and clean its outer surface of any foreign material along the location to be cut prior to passing the timber through the cutting station.

Referring again to FIG. 1, and more particularly to control station 20, a plurality of manual control levers 51–58, each of which serves to actuate a respective valve means for controlling the flow of pressurized fluid to the fluid motors 31–38 which drive the various individual mechanisms described above.

Figure 2:
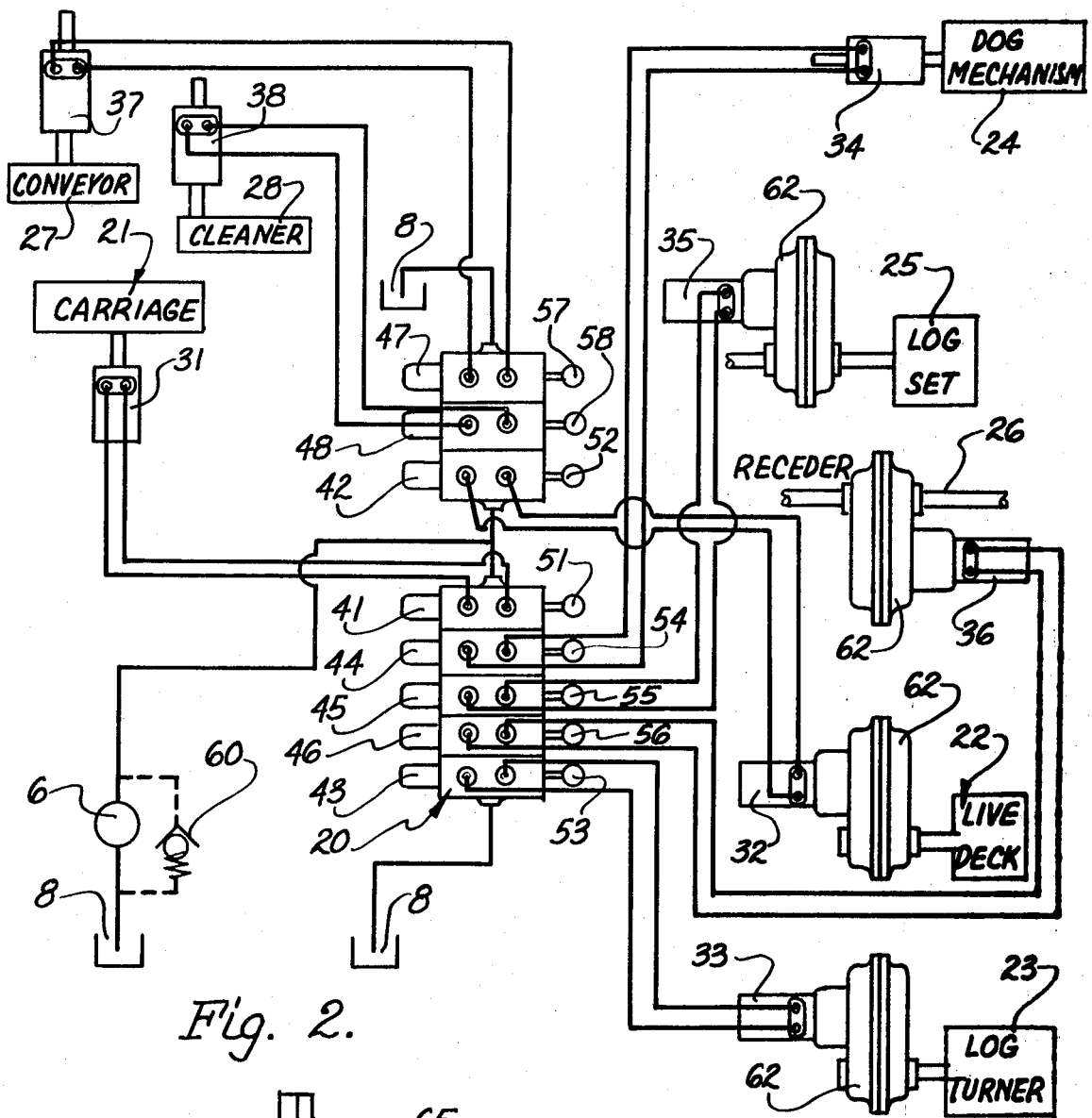
FIG. 2 is a diagrammatic view of the control system of the sawmill of FIG. 1.

Reference is next made to FIG. 2 for purposes of describing the operation of the above mentioned actuators 51–58, their respective valve means, as well as the other components of the hydraulic control system for the various operational functions of the mill.

It should now be mentioned that the various valves 41–48 receive pressurized fluid from a pump 6 having a pump inlet connected with reservoir 8 and a pump outlet connected by the hydraulic lines illustrated to all of the inlet ports of the various valves 41–48. Each of the valves 41–48 also include outlets for returning fluid to reservoir 8 via the various hydraulic lines illustrated in FIG. 2.

It should further be mentioned that each of the valves 41–48 are of a closed center type and when the manual actuator of the valve is in a "center" position the valves' respective motor is isolated from the pressurized fluid from pump 6. When the actuator of the valve is moved to a "forward" position pressurized fluid is delivered to a first port of the respective motor and drained to reservoir 8 from a second port of such motor. When the actuator of the valve is moved to a "reverse" position the fluid motor is driven in reverse by connection of the second port of the motor with pump 6 and said first port of the motor with reservoir 8.

The previously mentioned timber supporting carriage is indicated diagrammatically at 21 and is driven by carriage motor 31 that is controlled for both forward and reverse operation by valve 41 provided with manual carriage actuator 51.

With continued reference to FIG. 2, live deck 22 is diagrammatically illustrated in driven connection with a gear box 62, the latter being driven by live deck motor 32 that is controlled for both forward and reverse operation by live deck valve 42 that includes live deck actuator 52.

The previously described log turning apparatus 23 is operatively associated with gear box 62 and log turner motor 33, the latter being controlled for forward and reverse operation by log turner valve 43 provided with log turning actuator 53.

Referring again to FIG. 2, the previously described dog mechanism is diagrammatically illustrated at 24 and is driven by dog mechanism motor 34, the latter being controlled for forward and reverse operation by dog mechanism valve 44 provided with dog mechanism actuator 54.

The set mechanism previously described is diagrammatically illustrated at 25 and is driven by gear box 62 and set mechanism motor 35, the latter being controlled for forward and reverse operation by set mechanism valve 45 provided with set mechanism actuator 55.

Referring to the next operative function in FIG. 2, the diagrammatically illustrated receder mechanism is driven by gear box 62 and receder fluid motor 36 which is controlled for forward and reverse operation by receder valve 46 provided with receder actuator 56.

The conveyor mechanism for delivering boards beyond the track means is diagrammatically illustrated at 27 in FIG. 2 and includes a conveyor motor 37 for driving rollers 138, said motor being controlled for forward and reverse operation by conveyor valve 47 provided with conveyor actuator 57.

With continued reference to FIG. 2, the previously described log cleaner mechanism is diagrammatically illustrated at 28 and is driven by log cleaner fluid motor 38 which is controlled for forward or reverse operation by log cleaner valve 48 provided with log cleaner actuator 58.

With reference to FIG. 3, those of the fluid motors 41–48 which are provided with gear boxes 62 are connected thereto by a mount 63 with the shaft of the fluid motor being connected to the shaft of the gear box by a coupling 65.

In operation, the operator stands in control station 20 and manipulates carriage actuator 51 to position carriage 21 in alignment with the discharge end of live deck apparatus 22. Timbers positioned on the live deck are moved onto the carriage by manipulating live deck actuating lever 52.

If necessary the timber can be rotated about its longitudinal axis, so as to properly orient it by manipulation of log turning actuator 53. Dog mechanism actuating lever 54 is next manipulated to clamp the timber firmly on the carriage.

Carriage actuating lever 51 is next used to advance the carriage to a forward position wherein the timber lies adjacent to the previously mentioned square-set gauge 68. The square-set gauge is next raised to an operational position by depressing its actuating pedal in a manner described in detail in my co-pending application Ser. No. 809,247 filed Mar. 21, 1969 and set mechanism actuator 55 is next manipulated to move the timber towards the square-set gauge until the side of the timber engages the peripheral edge thereof. The timber is then properly zeroed or indexed with respect to the cutting path 76.

It will be understood that receder actuator 56 may be used to energize receder motor 36 whenever it is necessary to move the timber away from cutting path 76.

The operator next advances the carriage and timber to and through the cutting path, manipulating log cleaner actuator 58, if desired, to clean a path along the outer surface of the timber prior to presentation thereof to the saw blade.

As the board is sawn from the timber, conveyor actuating lever 57 is manipulated to drive the rollers of the conveyor and a three-way delivery control lever 66, described in detail in my co-pending application Ser. No. 809,246 filed Mar. 21, 1969, can be manipulated to set the angle of the conveyor rolls 138 so as to selectively discharge the board from either side of the conveyor or straight off the end thereof.

The carriage is next retracted by manipulating carriage actuator 51 to the reverse and the setting and sawing operation is repeated as previously described.

I claim:

1. A sawmill comprising, in combination, frame means including a control station; a circular saw blade rotatably mounted on said frame means and disposed in a cutting path; a pair of spaced track means disposed along said cutting path; a timber supporting carriage movable along said track means; a carriage fluid motor for driving said carriage along said track means; a live deck for delivering timbers to said carriage, a fluid motor for driving said live deck; a log turner for rotatably positioning said timbers on said carriage; a log turner fluid motor for driving said log turner; a vertically movable log engaging clamp mechanism on said carriage for holding said timbers on said carriage; a clamp mechanism fluid motor for driving said clamp mechanism; a set mechanism on said carriage for laterally moving a timber toward said cutting path; a set fluid motor for driving said set mechanism; a receder mechanism on said carriage for laterally moving a timber away from said cutting path; a receder fluid motor for driving said receder mechanism; a gauge means mounted on said frame means and including a member having a peripheral edge aligned with said cutting path and engagable with the side surface of a timber disposed on said carriage; and actuating means for moving said member between a first timber engaging position and a second position clear of the path of movement of the timber; a log cleaner mechanism for pre-cleaning a longitudinal path along the outer surface of a timber at a location to be engaged by the saw blade; a log cleaner fluid motor for driving said log cleaner mechanism; a valve means for controlling the flow of pressurized fluid to said log cleaner fluid motor, a conveyor beyond said track means for receiving and delivering boards from said cutting path, a conveyor fluid motor for driving said conveyor; pump means for delivering a flow of pressurized fluid; a plurality of valve means, each of which controls the flow of pressurized fluid to a respective one of said fluid motors, each of said valve means including a respective actuator disposed in said control station.

* * * * *